UNITED STATES PATENT OFFICE.

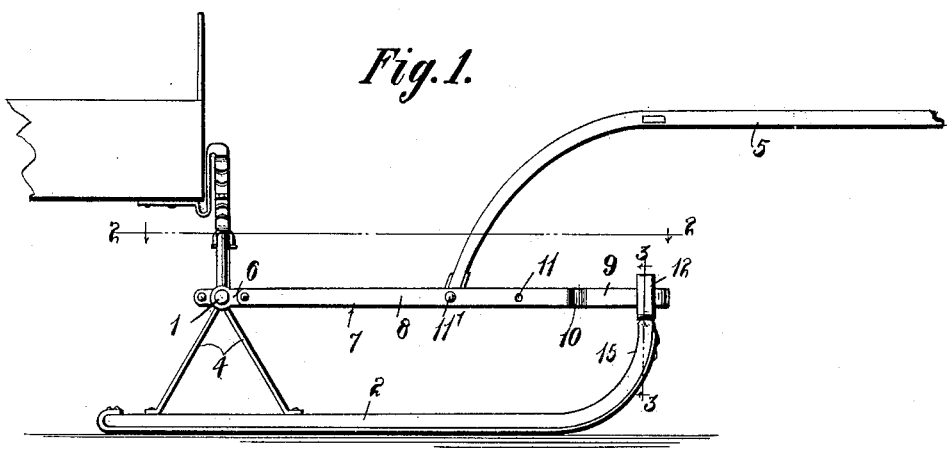

OLE G. RUDE, OF SACRED HEART, MINNESOTA.

SHAFT ATTACHMENT FOR VEHICLE-RUNNERS.

1,105,103.  Specification of Letters Patent.  Patented July 28, 1914.

Application filed April 20, 1912. Serial No. 692,023.

*To all whom it may concern:*

Be it known that I, OLE G. RUDE, a citizen of the United States, residing at Sacred Heart, in the county of Renville, State of Minnesota, have invented certain new and useful Improvements in Shaft Attachments for Vehicle-Runners; and I do hereby declare the following to be a full, clear, and exact description of the invention, such as will enable others skilled in the art to which it appertains to make and use the same.

This invention relates to means for attaching the shafts to a buggy or other vehicle which has been converted into a sleigh by removing the wheels therefrom.

The invention has for its object to provide a device of this character so constructed that the shafts may be removed from the usual clips carried by the axle of the vehicle and connected in the advance thereof.

With these and other objects in view, the invention consists in certain novel features of construction, combination and arrangement of parts as will be hereinafter fully described and claimed.

In the drawing Figure 1 is a fragmentary side elevation of a vehicle showing the device applied thereto. Fig. 2 is a sectional view on line 2—2 of Fig. 1. Fig. 3 is a sectional view on line 3—3 of Fig. 1. Fig. 4 is a sectional view on line 4—4 of Fig. 2. Fig. 5 is a detailed perspective view of the attaching slide. Fig. 6 is a sectional view on line 6—6 of Fig. 2.

Referring to the drawing, the numeral 1 designates the front axle of a vehicle, the usual wheels being removed therefrom, and runners 2 substituted therefor, it being of course understood that runners have also been substituted for the rear wheels (not shown). The runners 2 are connected to the front axle 1 by clips 3 which embrace the ends of the axles, said clips being connected to the upper ends of the brace bars 4. Upon the usual shafts 5 being disconnected from the clips 6 carried by the front axle, the inner ends of the hitch members 7 are connected thereto, as clearly shown in Fig. 2 of the drawing, said hitch members consisting of a single length of metal and bent to form a pair of spaced parallel bars 8, the outer ends of which are flush against each other, as at 9, and held in their spaced relation by an offset 10. The bars 8 are each provided with a pair of spaced perforations 11, arranged in registered relation for receiving bolts 11', and by which the ends of the shafts 5 may be connected. It is obvious that the shafts may have their inner ends connected to either one of the perforations 11 thus positioning the draft animal nearer or farther away from the vehicle, as desired.

Slidably mounted upon the outer ends of the bars 8 are brackets 12, each of which is provided with a perforated extension 13 which is adapted to register with the internally threaded sleeve 14, which is mounted in the upturned end 15 of each of the runners 2. A bolt 16 is passed through the perforated extension 13 and engages the sleeve 14, thus effectually supporting the hitch members 7 at their outer ends. From this construction, it will be seen that by providing the brackets 12, the hitch bars are adapted to be readily attached to runners of different lengths.

It is obvious that a vehicle tongue may be conveniently connected to the hitch bars in lieu of the shaft, and as the same may require.

What is claimed is:

The combination with the front axle of a vehicle, of runners connected thereto, clips carried by the front axle, hitch members having their inner ends connected to said clips, brackets carried by the upturned ends of the runners and carrying the forward ends of said hitch members, said hitch members being formed from single lengths of metal bent upon themselves to provide parallel bars, an offset formed in one of the bars to hold the same spaced apart, bolts adjustably carried by the bars for securing the inner ends of a vehicle shaft to the hitch members.

In testimony whereof, I affix my signature, in presence of two witnesses.

OLE G. RUDE.

Witnesses:
 BERT LISTERUD,
 CLARENCE TOLLEFSON.

---

Copies of this patent may be obtained for five cents each, by addressing the "Commissioner of Patents, Washington, D. C."